*(12)* United States Patent
Shirakura et al.

(10) Patent No.: US 10,884,668 B2
(45) Date of Patent: Jan. 5, 2021

(54) MEMORY SYSTEM

(71) Applicant: Toshiba Memory Corporation, Tokyo (JP)

(72) Inventors: Hiroya Shirakura, Fujisawa Kanagawa (JP); Kyoko Shoji, Tokyo (JP); Shinya Takeda, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 16/556,052

(22) Filed: Aug. 29, 2019

(65) Prior Publication Data

US 2020/0301610 A1    Sep. 24, 2020

(30) Foreign Application Priority Data

Mar. 19, 2019   (JP) .................................. 2019-051428

(51) Int. Cl.
*G06F 3/06*   (2006.01)
*G06F 13/42*   (2006.01)
(Continued)

(52) U.S. Cl.
CPC .......... *G06F 3/0659* (2013.01); *G06F 3/0619* (2013.01); *G06F 3/0679* (2013.01); (Continued)

(58) Field of Classification Search
CPC .... G06F 3/0659; G06F 3/0619; G06F 3/0679; G06F 13/1668; G06F 11/1044; G06F 9/4411
See application file for complete search history.

(56) References Cited

U.S. PATENT DOCUMENTS 7,877,569 B2   1/2011   Honda
8,966,202 B2 *  2/2015   Fukushima ............. G06F 21/62
                                                           711/163
(Continued)

FOREIGN PATENT DOCUMENTS

JP   2014071914 A   4/2014
JP   2014106604 A   6/2014
(Continued)

OTHER PUBLICATIONS

GD25Q256D datasheet, elm-tech.com, gigidevice (Year: 2017).*
MX25L12836E datasheet, Macronix International LTD. (Year: 2012).*

*Primary Examiner* — Henry Tsai
*Assistant Examiner* — Christopher A Daley
(74) *Attorney, Agent, or Firm* — Kim & Stewart LLP

(57) ABSTRACT

A memory system includes a controller and a non-volatile memory device. The controller is connectable to a host device by a bus conforming to a serial peripheral interface (SPI) standard, and configured to recognize a command signal that is received over the bus immediately after a chip select signal is received over the bus. The non-volatile memory device stores first information indicating a data size, second information indicating a manufacturer ID, third information indicating a device ID, and fourth information. The controller, upon recognizing that the command signal is an identification (ID) read command, outputs to the host device, response information that has the data size indicated by the first information and includes any one of: (i) the second information and the third information, and (ii) the second information, the third information, and the fourth information.

20 Claims, 11 Drawing Sheets

(51) Int. Cl.
*G06F 13/16* (2006.01)
*G06F 11/10* (2006.01)
*G06F 9/4401* (2018.01)

(52) U.S. Cl.
CPC ........ *G06F 9/4411* (2013.01); *G06F 11/1044* (2013.01); *G06F 13/1668* (2013.01); *G06F 13/4282* (2013.01)

(56) References Cited

U.S. PATENT DOCUMENTS

| | | | |
|---|---|---|---|
| 9,104,539 B2* | 8/2015 | Fujimoto | G11C 5/00 |
| 10,621,034 B2 | 4/2020 | Kodera et al. | |
| 2006/0236204 A1* | 10/2006 | Lee | G06F 3/0679 |
| | | | 714/763 |
| 2009/0103380 A1* | 4/2009 | Pekny | G06F 3/0679 |
| | | | 365/201 |
| 2013/0279253 A1* | 10/2013 | Ogawa | G11C 8/12 |
| | | | 365/185.05 |
| 2014/0372831 A1* | 12/2014 | Oh | G06F 11/1012 |
| | | | 714/764 |
| 2018/0113652 A1 | 4/2018 | Kodera et al. | |

FOREIGN PATENT DOCUMENTS

| TW | 200608201 A | 3/2006 |
|---|---|---|
| TW | 201709213 A | 3/2017 |

* cited by examiner

FIG. 3

| Pin no. | Pin function |
|---|---|
| 1 | Hold input (/HOLD)/serial data output3 (SO3) |
| 2 | Power supply (Vcc) |
| 3 | No connection (NC) |
| 4 | No connection (NC) |
| 5 | No connection (NC) |
| 6 | No connection (NC) |
| 7 | Chip select (/CS) |
| 8 | Serial data output (SO)/serial data output1 (SO1) |
| 9 | Write protect (/WP)/serial data output2 (SO2) |
| 10 | Ground (Vss) |
| 11 | No connection (NC) |
| 12 | No connection (NC) |
| 13 | No connection (NC) |
| 14 | No connection (NC) |
| 15 | Serial data input (SI)/serial data output0 (SO0) |
| 16 | Serial clock input (SCK) |

FIG. 4

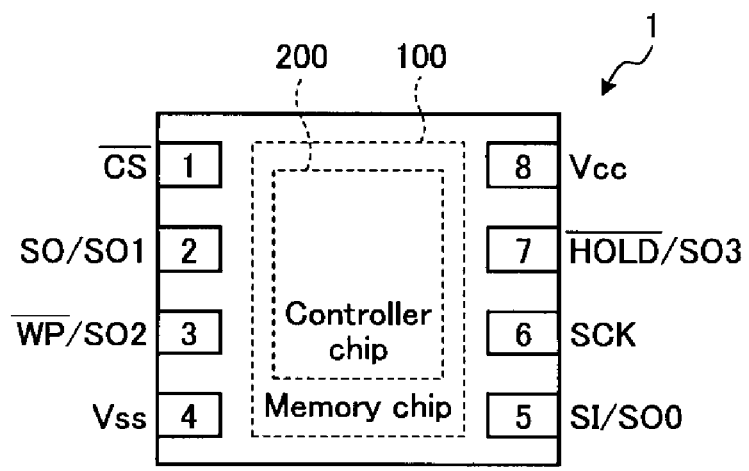

FIG. 5

| Pin no. | Pin function |
| --- | --- |
| 1 | Chip select (/CS) |
| 2 | Serial data output (SO)/serial data output1 (SO1) |
| 3 | Write protect (/WP)/serial data output2 (SO2) |
| 4 | Ground (Vss) |
| 5 | Serial data input (SI)/serial data output0 (SO0) |
| 6 | Serial clock input (SCK) |
| 7 | Hold input (/HOLD)/serial data output3 (SO3) |
| 8 | Power supply (Vcc) |

| Item | Description | Bit | | | | | | | |
|---|---|---|---|---|---|---|---|---|---|
| | | 7 | 6 | 5 | 4 | 3 | 2 | 1 | 0 |
| Page size | 2KByte | | | | | | | 0 | 0 |
| | 4KByte | | | | | | | 0 | 1 |
| OOB size | ECCON=16Byte/ECCOFF=32Byte | | | | | 0 | 0 | | |
| Block size | 128KByte | | | 0 | 0 | | | | |
| | 256KByte | | | 0 | 1 | | | | |
| Bus width | Read x4 max/Program x4 max | 0 | 1 | | | | | | |

NOR Boot

NAND Boot

MEMORY SYSTEM

CROSS-REFERENCE TO RELATED APPLICATION

This application is based upon and claims the benefit of priority from Japanese Patent Application No. 2019-051428, filed Mar. 19, 2019, the entire contents of which are incorporated herein by reference.

FIELD

Embodiments described herein relate generally to a memory system.

BACKGROUND

A NAND type flash memory device that conforms to a serial peripheral interface (SPI) standard is known. In such a memory device, upon receiving a command to read an ID (e.g., Read ID command defined in the SPI standard) from a host device, a controller of such a NAND type flash memory outputs a manufacturer ID code and a device ID code.

DESCRIPTION OF THE DRAWINGS

FIG. 3 is a table describing the function of each pin of the memory system of FIG. 1.

FIG. 4 is a plan view schematically illustrating another example of a memory system according to the embodiment.

FIG. 5 is a table describing the function of each pin of the memory system of FIG. 4.

DETAILED DESCRIPTION

In general, a memory system according to an embodiment includes a controller and a NAND type flash memory. The controller is connectable to a host device by a bus conforming to a serial peripheral interface (SPI) standard, and configured to recognize a command signal that is received over the bus immediately after a chip select signal is received over the bus. The non-volatile memory device stores first information indicating a data size, second information indicating a manufacturer ID, third information indicating a device ID, and fourth information. The controller, upon recognizing that the command signal is an identification (ID) read command, outputs to the host device, response information that has the data size indicated by the first information and includes any one of: (i) the second information and the third information, and (ii) the second information, the third information, and the fourth information.

Hereinafter, an embodiment will be described with reference to FIG. 1 to FIG. 16. In the present specification, elements of the embodiment and the descriptions thereof are examples and are not limited by the expressions given in the present specification. The elements may be specified by different names and expressions from that given in the present specification.

Figure 1:
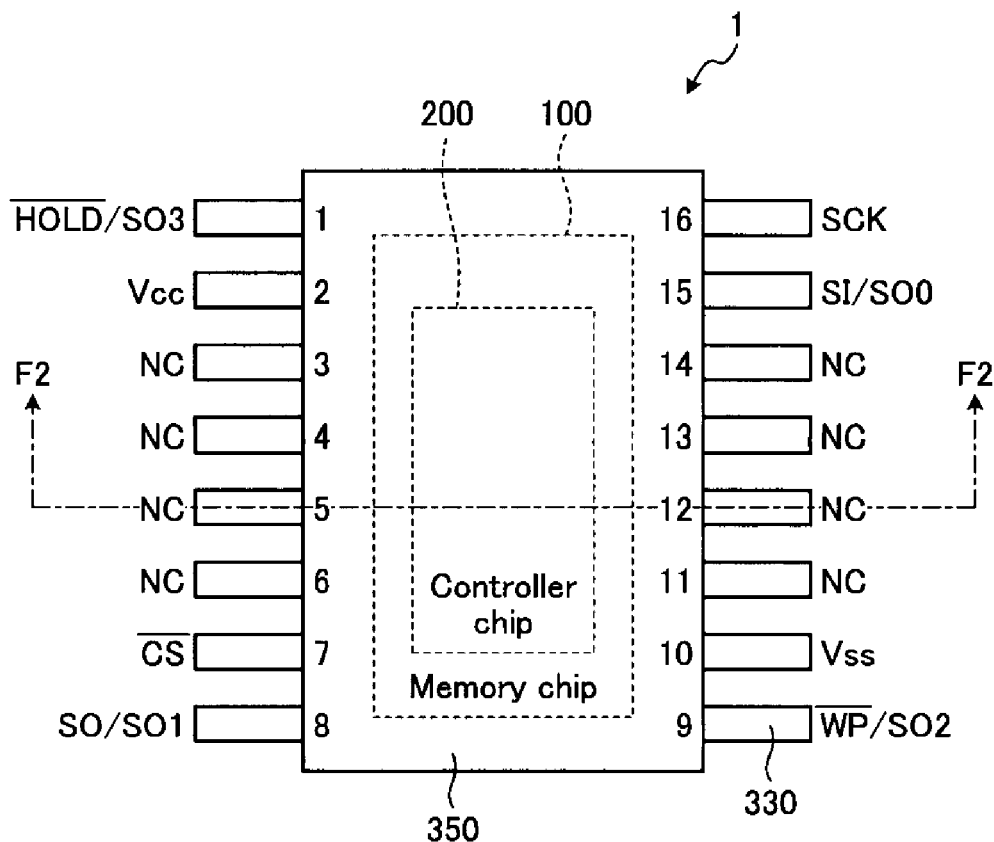
FIG. 1 is a plan view schematically illustrating an example of a memory system according to an embodiment.
Figure 2:
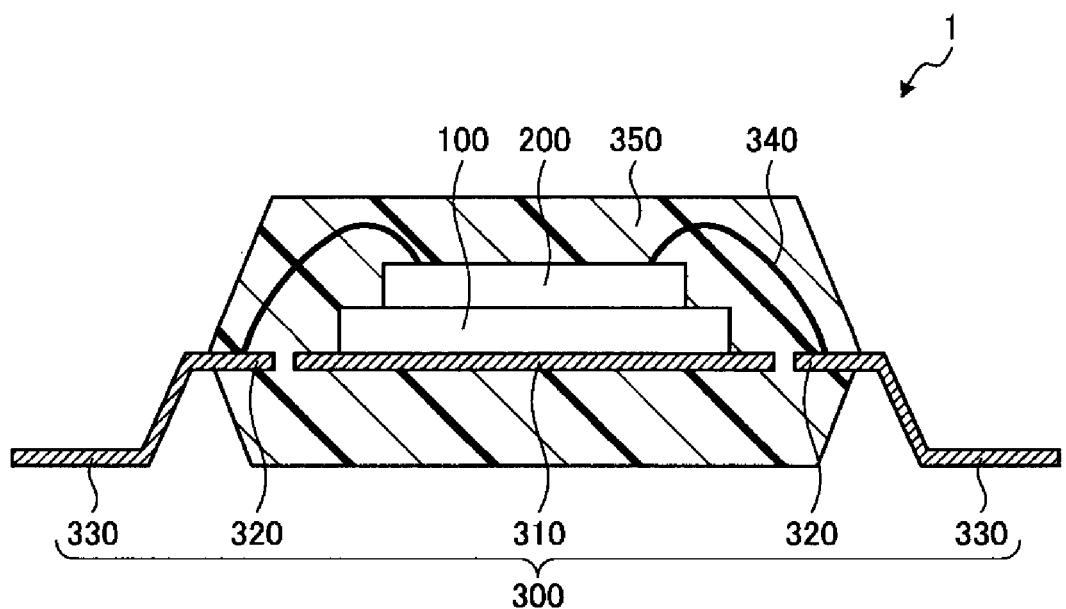
FIG. 2 is a cross-sectional view schematically illustrating the memory system of FIG. 1 along line F2-F2 shown in FIG. 1.

FIG. 1 is a plan view schematically illustrating an example of a memory system 1 according to the present embodiment. FIG. 2 is a cross-sectional view schematically illustrating the memory system 1 along a dashed line F2-F2 in FIG. 1.

As illustrated in FIG. 1 and FIG. 2, the memory system 1 includes a memory chip 100 and a controller chip 200, each of which are semiconductor chips. The memory chip 100 is an example of a NAND type flash memory. The controller chip 200 is an example of a controller.

The memory chip 100 includes a semiconductor memory such as a NAND type flash memory. The controller chip 200 includes a controller that controls the memory chip 100. The memory chip 100 and the controller chip 200 are mounted on a lead frame 300 and sealed and packaged by resin 350.

Specifically, as illustrated in FIG. 2, the memory chip 100 is mounted on a die pad 310 of the lead frame 300. The controller chip 200 is mounted on the memory chip 100. The controller chip 200 is connected to an inner lead 320 of the lead frame 300 by, for example, bonding wires 340. Furthermore, the controller chip 200 is also connected to the memory chip 100 by bonding wires. The memory chip 100, the controller chip 200, the die pad 310, the inner lead 320, and the bonding wire 340 are sealed by the resin 350.

The inner leads 320 are connected to outer leads 330 exposed to the outside of the resin 350. The outer leads 330 function as external connection terminals (e.g., external connection pins) of the memory system 1.

In the example of FIG. 1, 16 external connection terminals from a first pin to 16th pin are prepared. The memory system 1 accesses the memory chip via the first to 16th pins to communicate with the host device that controls the memory system 1.

FIG. 3 is a table describing the function of each pin of the memory system 1. As illustrated in FIG. 3, the first pin (pin no. 1) is used for inputting a control signal /HOLD or for outputting serial data SO3. The control signal /HOLD is asserted ("L" level) when temporarily stopping the communication between the host device and the memory system 1. The second pin (pin no. 2) receives a power supply voltage Vcc. The 3rd to 6th pins (pin nos. 3 to 6) and the 11th pin to 14th pins (pin nos. 11 to 14) are unused pins, and may be used, for example, when it becomes necessary to transmit and receive any signal or data in the future. The 7th pin (pin no. 7) receives a chip select signal /CS. The chip select signal /CS is a signal for activating the memory chip 100 and the controller chip 200 (a signal activated when accessing the memory system 1), and, for example, is asserted ("L" level) at the timing when the host device inputs a command to the memory system 1. The 8th pin (pin no. 8) is used for outputting serial data (SO or SO1). The 9th pin (pin no. 9) is used for inputting a control signal /WP or for outputting serial data (SO2). The control signal /WP is a write protection setting signal, and is asserted ("L" level) for preventing the write inhibition setting to the memory chip. The 10th pin (pin no. 10) receives a reference potential Vss. The 15th pin (pin no. 15) is used for inputting serial data (SI) or outputting serial data (SO0). The 16th pin (pin no. 16) receives a serial clock signal SCK.

The above pin configuration conforms to the serial peripheral interface (SPI) standard. By selecting any of the first pin, the 8th pin, the 9th pin, and the 15th pin for the serial data outputting, the data is output to the host device at an original speed, at a double speed, or at a quadruple speed.

FIG. 4 is a plan view schematically illustrating another example of a memory system 1 according to the embodiment. In the example in FIG. 4, eight external connection terminals from a first pin to an eighth pin are provided. FIG. 5 is a table describing the function of each pin of memory system 1 in the example of FIG. 4.

As illustrated in FIG. 5, the first pin (pin no. 1) receives a chip select signal /CS, the second pin (pin no. 2) outputs serial data SO and SO1, the third pin (pin no. 3) receives a write protect signal /WP, or outputs serial data SO2, the 4th pin (pin no. 4) receives a reference potential Vss, the 5th pin (pin no. 5) receives serial data SI or outputs serial data SO0, the 6th pin (pin no. 6) receives serial clock SCK, the 7th pin (pin no. 7) receives a control signal /HOLD, or outputs serial data SO3, and the 8th pin (pin no. 8) receives a power supply voltage Vcc. Also, in the example in FIG. 5 *o*, the pin configuration conforms to the SPI standard.

Figure 6:
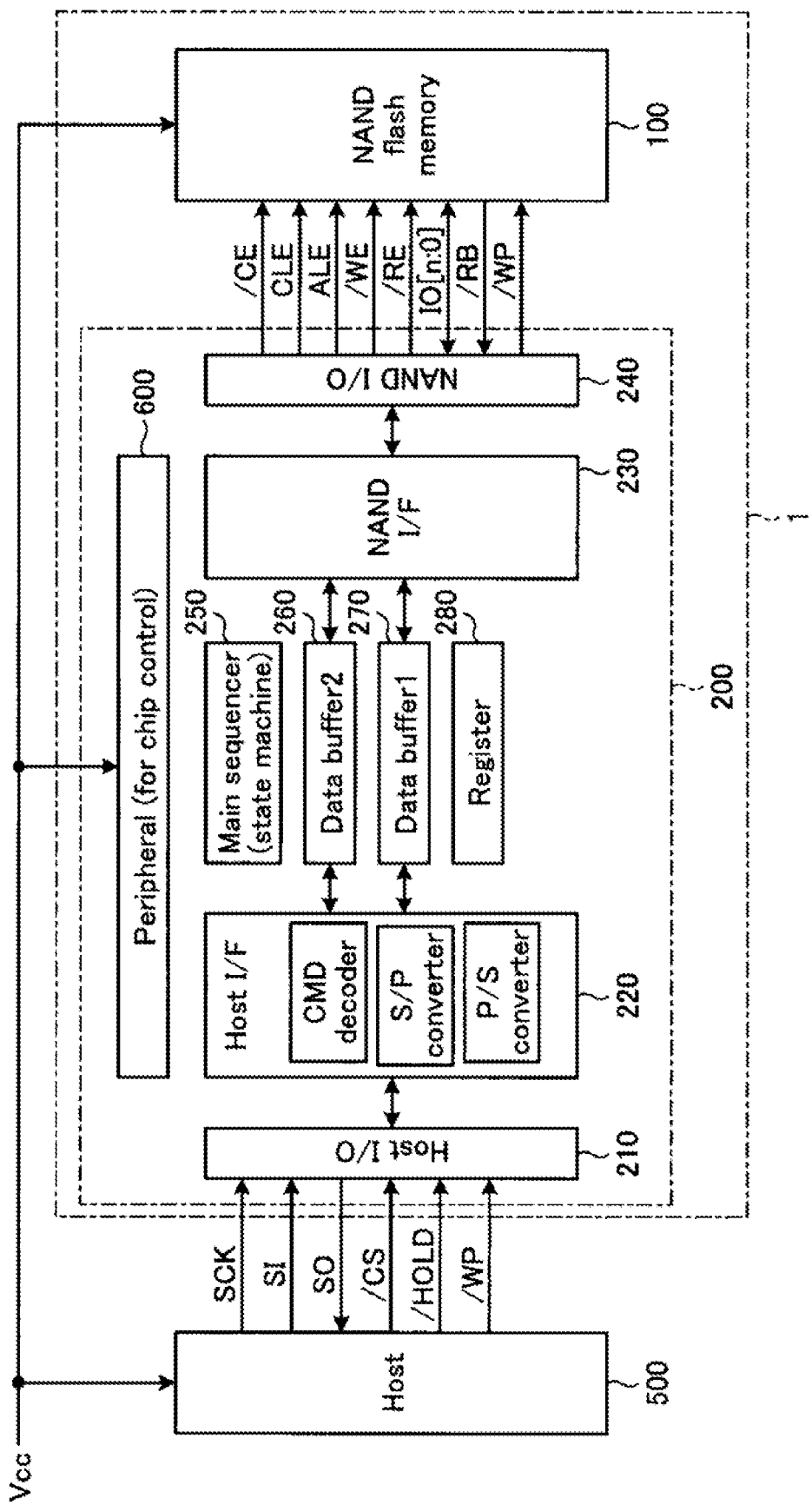
FIG. 6 is a functional block diagram schematically illustrating an internal configuration of the memory system according to the embodiment.

FIG. 6 is a functional block diagram schematically illustrating an internal configuration of the memory system 1 according to the embodiment. Hereinafter, the memory chip 100 will be referred to as a NAND type flash memory 100 and the controller chip 200 will be referred to simply as a controller 200.

As illustrated in FIG. 6, the memory system 1 includes the NAND type flash memory 100 and the controller 200. The NAND type flash memory 100 includes a plurality of memory cells and stores data in a non-volatile manner. The controller 200 is connected to the NAND type flash memory 100 through the NAND bus, and is connected to a host device 500 through the SPI bus conforming to the SPI standard. The controller 200 controls the access to the NAND type flash memory 100.

The SPI bus is as described in FIG. 3 and FIG. 5. The NAND bus transmits and receives signals according to the NAND interface standard. Specific examples of such signals are a chip enable signal /CE, an address latch enable signal ALE, a command latch enable signal CLE, a write enable signal /WE, a read enable signal /RE, a ready busy signal /RB, an input/output signal I/O, and a write protect signal /WP.

The signal /CE is asserted at a low level and is a signal for activating the NAND type flash memory 100, and is asserted when accessing the NAND type flash memory 100. The signal CLE and the signal ALE are signals for notifying the NAND type flash memory 100 of a fact that the input signal I/O input to the NAND type flash memory 100 is respectively a command and an address. The signal /WE is asserted at a low level, and is a signal for incorporating the input signal I/O to the NAND type flash memory 100. The signal /RE is also asserted at a low level, and is a signal for reading the output signal I/O from the NAND type flash memory 100. The ready busy signal /RB is a signal indicating whether the NAND type flash memory 100 is in ready state (ready to receive a command from the controller 200) or in a busy state (not ready to receive a command from the controller 200), and the low level indicates the busy state. The input output signal I/O is, for example, an 8-bit (n=8) signal. The input output signal I/O comprises data transmitted and received between the NAND type flash memory 100 and the controller 200, and may include a command, an address, write data, read data, and the like. The write protect signal /WP is a signal for inhibiting writing to the NAND type flash memory 100.

Next, details of a configuration of the controller 200 will be described. As illustrated in FIG. 6, the controller 200 includes a host input/output circuit 210, a host interface circuit 220, a NAND interface circuit 230, a NAND input output circuit 240, a sequencer (e.g., a state machine) 250, data buffers 260 and 270, a register 280, and a peripheral circuit 600. The register 280 is an example of a storage area. The storage area is not limited to the register 280. For example, another storage device such as a RAM or another storage area, may be an example of a storage area.

The host input output circuit 210 functions as a buffer for signals transmitted to and received from the host device 500. The signals SCK, SI, /CS, /HOLD, and /WP output from the host 500 are received by the host input/output circuit 210, and then output to the host interface circuit 220.

The host interface circuit 220 incorporates the signal SI in synchronization with the signal SCK. The host interface circuit 220 also transmits the signal SO output in synchronization with the signal SCK to the host device 500 via the host input/output circuit 210.

The host interface circuit 220 manages the transmission and reception of the signals to and from the host device 500 via the host input/output circuit 210. In addition, the host interface circuit 220 also functions as a serial-to-parallel converter and a parallel-to-serial converter. For example, the host interface circuit 220 converts the input signal SI from the host device 500 from a serial signal to a parallel signal, and converts the data read from the NAND type flash memory 100 from a parallel signal to a serial signal. Furthermore, the host interface circuit 220 functions as a command decoder when the input signal SI is a command, and performs decoding of the received command. Then, a result of decoding is output to, for example, the sequencer 250.

The data buffers 260 and 270 temporarily store write data received from the host device 500 via the host interface circuit 220. Furthermore, the data read from the NAND type flash memory 100 is temporarily stored via the NAND interface circuit 230.

The register 280 includes various registers such as, for example, a status register and an address register. The status register stores various status information of the memory system 1, such as a feature table. The address register stores the address received from the host device 500 via the host interface circuit 220.

The NAND interface circuit 230 manages the transmission and reception of the signals to and from the NAND type flash memory 100 via the NAND input output circuit 240. The NAND interface circuit 230 issues various commands conforming to the NAND interface standard in response to the command from the sequencer 250, and outputs the commands to the NAND type flash memory 100 via the NAND input output circuit 240 together with the address in the address register.

When data is to be written, the NAND interface circuit 230 outputs the data in the data buffer 260 and/or 270 to the NAND type flash memory 100 via the NAND input output circuit 240. Furthermore, when data is to be read, the NAND interface circuit 230 transfers the data read from the NAND type flash memory 100 to the data buffer 260 and/or data buffer 270.

The NAND input output circuit 240 functions as a buffer for the signals transmitted and received to and from the NAND type flash memory 100. In addition, in response to the command from the NAND interface circuit 230, the signals /CE, CLE, ALE, /WE, /RE, /WP are asserted or de-asserted. Furthermore, when data is to be read, the NAND input output circuit 240 temporarily stores the signal IO containing the read data, transfers the signal IO to the NAND interface circuit 230, and when data is to be written, temporarily stores the signal IO containing the write data and sends the signal IO to the NAND type flash memory 100. In addition, the NAND input output circuit 240 receives the ready busy signal /RB from the NAND type flash memory 100 and transfers the signal /RB to the NAND interface circuit 230.

The sequencer 250 controls the overall operation of the controller 200. For example, when there is a request from the host device 500 to read data, the sequencer 250 instructs the NAND interface circuit 230 to perform a sequence of performing the reading operation. In addition, when there is a request from the host device 500 to write data, the sequencer 250 instructs the NAND interface circuit 230 to perform a sequence of performing the writing operation. Furthermore, the sequencer 250 updates the feature table in the status register according to the status information received from the NAND type flash memory 100.

The peripheral circuit 600 receives the power supply voltage Vcc from the outside, transfers the power supply voltage Vcc to each circuit block, and performs other controls necessary for the operation of the controller 200.

Figure 7:
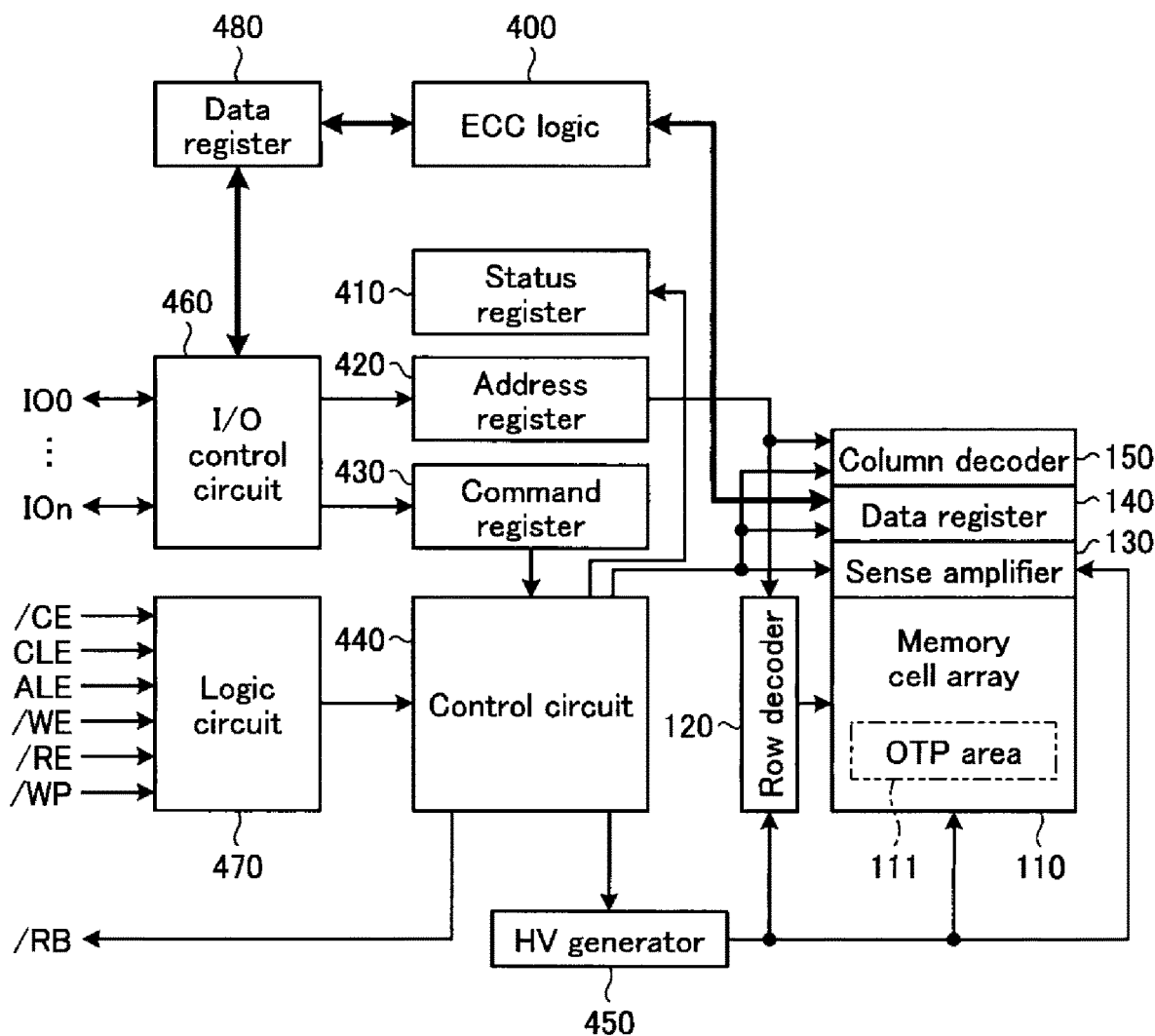
FIG. 7 is a functional block diagram schematically illustrating an internal configuration of a NAND type flash memory in the embodiment.

Next, a configuration of the NAND type flash memory 100 will be described using FIG. 7. FIG. 7 is a functional block diagram schematically illustrating an internal configuration of the NAND type flash memory 100 in the present embodiment.

As illustrated in FIG. 7, the NAND type flash memory 100 includes a memory cell array 110, a row decoder 120, a sense amplifier 130, a data register 140, a column decoder 150, an Error Checking and Correction (ECC) circuit 400, a status register 410, an address register 420, a command register 430, a control circuit 440, a voltage generation circuit 450, an input output control circuit 460, a logic circuit 470, and a data register 480.

The memory cell array 110 includes a plurality of non-volatile memory cells associated with rows and columns. The memory cells in the same row are connected to the same word line, and the memory cells in the same column are connected to the same bit line. Data reading and writing are collectively performed on a plurality of memory cells connected to the same word line, which is a unit referred to as a page. The data in one page includes user data and administrative data. The user data is managed in units called sectors. For example, one page includes 4 sectors, and each sector has 512 bytes of data size. The administrative data includes, for example, ECC data (one or more parity bits) for error correction. The error correction is performed on a sector-by-sector basis. Therefore, the administrative data includes ECC data prepared for each sector. In addition, data erasing is collectively performed in units of multiple pages, which is referred to as a block.

The row decoder 120 performs decoding of a row address that designates the row direction of the memory cell array 110. Then, the row decoder 120 selects a word line according to the result of decoding, and applies a voltage necessary for the data writing, reading, and erasing.

When data is to be read, the sense amplifier 130 senses the data read from the memory cell array 110 and transfers the data to the data register 140. When data is to be written, the sense amplifier 130 transfers the data in the data register 140 to the memory cell array 110.

The data register 140 temporarily stores one page of write data or read data.

The column decoder 150 performs decoding of a column address that designates the column direction of the memory cell array 110. Then, the column decoder 150 transfers the data to the data register 140 when data is to be written, and reads the data from the data register 140 when data is to be read according to the result of decoding.

The ECC circuit 400 performs error detection and error correction processing. Specifically, the ECC circuit 400 generates the parity for each sector based on the data received from the controller 200 at the time of data writing, and transfers the parity and user data to the data register 140. The ECC circuit 400 generates a syndrome for each sector based on the parity included in the data transferred from and data register 140 when data is to be read, and detects the presence or absence of an error. When an error is detected, the bit position is specified and the error is corrected. The number of correctable error bits per sector is, for example, 8 bits per sector. In addition, the ECC circuit 400 outputs the number of error bits detected in each sector to the status register 410 as status information.

The logic circuit 470 receives signals /CE, CLE, ALE, /WE, /RE, and /WP from the controller 200.

The input output control circuit 460 receives a signal IO [n: 0]. Then, the input output control circuit 460 stores the signal IO in the address register 420 when the IO signal is an address (when ALE="H"). In addition, the input output control circuit 460 stores the IO signal in the command register 430 when the signal IO is a command (when CLE="H"). Furthermore, the input output control circuit 460 stores the IO signal in the data register 480 when the signal IO is data (when ALE=CLE="L").

The status register 410 stores various status information of the NAND type flash memory 100. The status information includes the number of error bits given from the above-described ECC circuit 400, and information indicating whether the writing operation and the erasing operation given from the control circuit 440 are successful (pass) or fail (fail).

The control circuit 440 performs overall control of the NAND type flash memory 100 based on the command stored in the command register 430 and various signals input to the logic circuit 470. In addition, the control circuit 440 generates a ready busy signal /RB and outputs the signal to the controller 200.

The voltage generation circuit 450 generates a voltage necessary for the data writing, reading and erasing operations based on the command of the control circuit 440, and supplies the generated voltage to the memory cell array 110, the row decoder 120, and the sense amplifier 130.

The memory cell array 110 includes a one-time programmable (OTP) area 111. The OTP area 111 is a non-volatile and one-time-only writable area. The OTP area 111 may be an area for one-time-only writing thereinto by various methods such as a fuse type. The OTP area 111 may be provided separately from the memory cell array 110.

Figure 8:
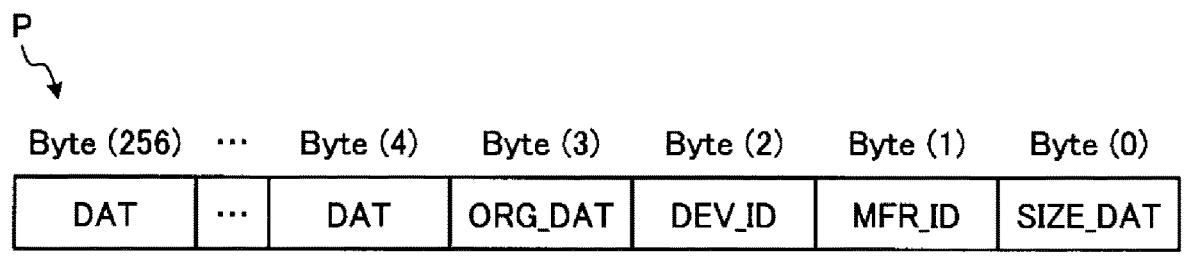
FIG. 8 is a schematic diagram illustrating an example of an ID page in the embodiment.

FIG. 8 is a schematic diagram illustrating an example of an ID page P in the embodiment. At least one page is provided in the OTP area 111. One of the pages in the OTP area 111 is the ID page P illustrated in FIG. 8.

As illustrated in FIG. 8, 256 bytes of data including output size information SIZE_DAT, manufacturer ID information MFR_ID, device ID information DEV_ID, organization information ORG_DAT, and multiple other information DAT are stored in the ID page P in the OTP area 111. The output size information SIZE_DAT, the manufacturer ID information MFR_ID, the device ID information DEV_ID, the organization information ORG_DAT, and other information DAT stored in the ID page P are an example of the information group. The output size information SIZE_DAT is an example of first information. The manufacturer ID information MFR_ID is an example of second information. The device ID information DEV_ID is an example of third information. The organization information ORG_DAT is an example of fourth information.

In the present embodiment, each of the output size information SIZE_DAT, the manufacturer ID information MFR_ID, the device ID information DEV_ID, the organization information ORG_DAT, and other information DAT each have a 1 byte data size. The data size of each of the output size information, the manufacturer ID information, the device ID information, and the organization information is not limited to this example of a 1 byte data size.

The output size information SIZE_DAT indicates a data size of information output by the controller 200 that received and recognized the ID read command. One byte (8 bits) of output size information SIZE_DAT may indicate 256 different data sizes. The range of data size indicated by output size information SIZE_DAT differs depending on the data size unit. The data size unit may be set to 1 bit. The size of the information may also be expressed as the number (or amount) of information. For example, in a case of eight (8) bits, the number (or amount) of information is eight.

The manufacturer ID information MFR_ID indicates a manufacturer ID unique to a manufacturer of the memory system 1. The device ID information DEV_ID indicates a device ID unique to the configuration of the memory system 1.

Figures 9, 10:
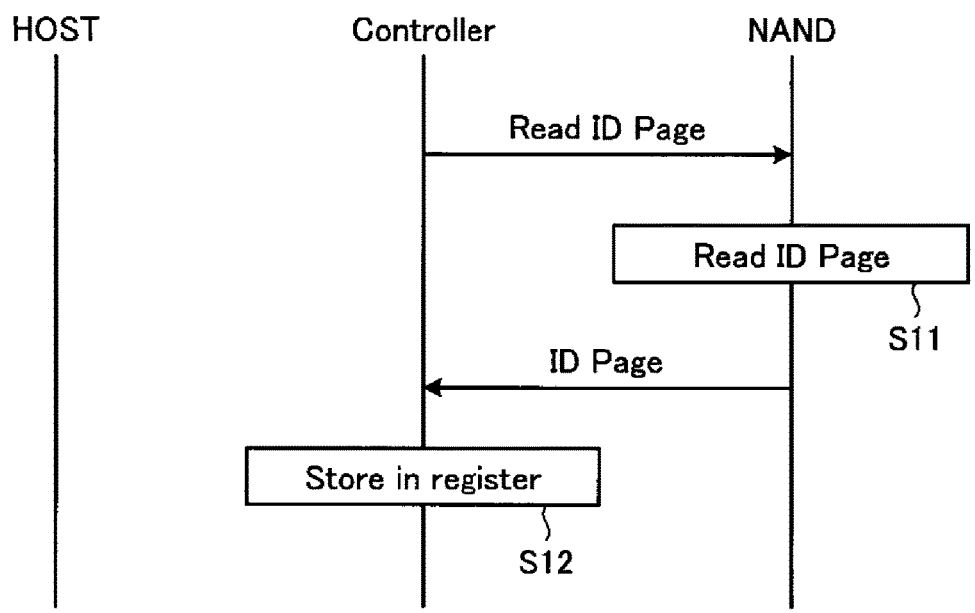
FIG. 9 is a table describing organization information in the ID page.
FIG. 10 is a diagram illustrating an example of operations of a controller and the NAND type flash memory during an ID page reading operation, according to the embodiment.

FIG. 9 is a table describing organization information ORG_DAT in the ID page. The organization information ORG_DAT indicates a page size, a block size, an out-of-band (OOB) size, and a bus width. The page size is information indicating a size of data to be collectively read and written. The block size is information indicating a size of data to be collectively erased. The OOB size is information indicating a redundant area size used for ECC.

Other information DAT in FIG. 8 may indicate various information or may not indicate any information. In addition, the ID page P may not include other information DAT or may include the data larger than 256 bytes.

In the ID page P, the manufacturer ID information MFR_ID, the device ID information DEV_ID, the organization information ORG_DAT, and other information DAT are stored in this order in the area next to (adjacent to) the output size information SIZE_DAT. In the present embodiment, the manufacturer ID information MFR_ID is stored in the area one byte apart from the output size information SIZE_DAT, the device ID information DEV_ID is stored in the area two bytes apart from the output size information SIZE_DAT, the organization information ORG_DAT is stored in the area three bytes apart from the output size information SIZE_DAT, and multiple other information DAT are stored in the areas four bytes to 256 bytes apart from the output size information SIZE_DAT in this order.

The output size information SIZE_DAT, the manufacturer ID information MFR_ID, the device ID information DEV_ID, the organization information ORG_DAT, and the multiple other information DAT are written into, for example, the ID page P in the OTP area 111 before shipment of the memory system 1. Once these data are written into the OTP area 111, the OTP area 111 becomes a non-writable read only area.

Not limited to the above example, the manufacturer ID information MFR_ID, the device ID information DEV_ID, the organization information ORG_DAT, and other information DAT may be stored in an area separate from the output size information SIZE_DAT, or may be stored in a page different from the output size information SIZE_DAT.

Figure 11:
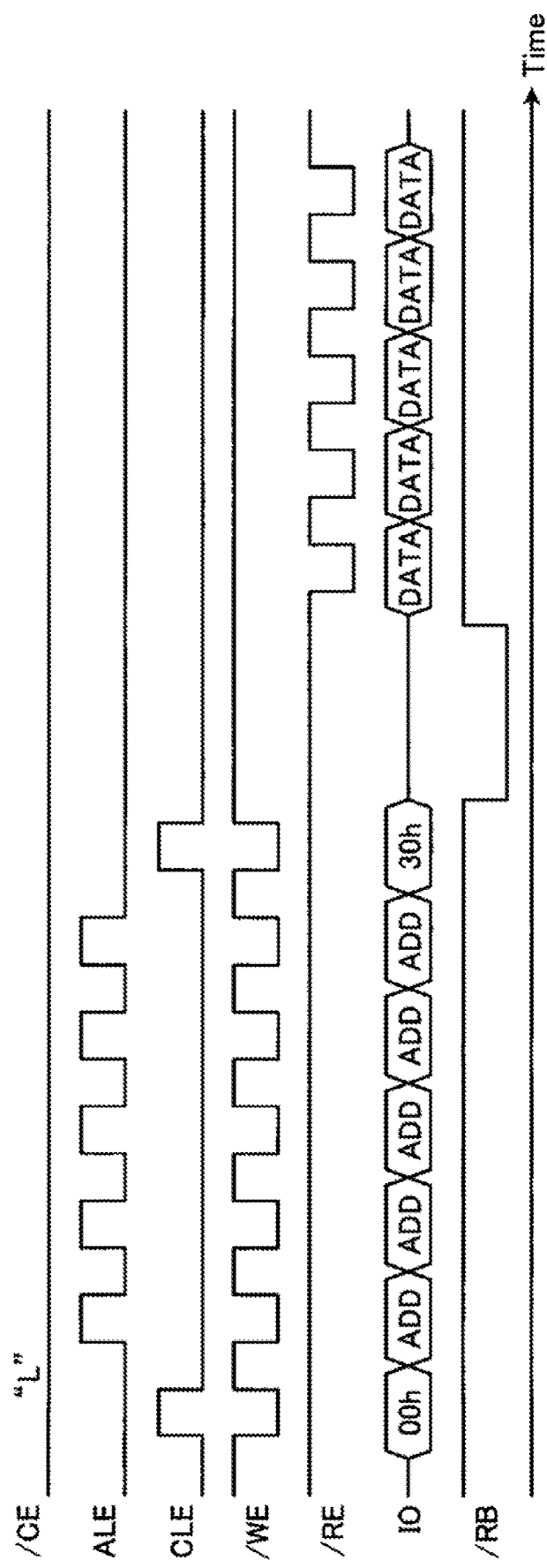
FIG. 11 is a time chart of various signals on a NAND bus during the ID page reading operation.

Next, the ID page reading operation in the memory system 1 in the present embodiment will be described. FIG. 10 is a diagram illustrating an example of operations of the controller 200 and the NAND type flash memory 100 during the ID page reading operation, according to the embodiment. FIG. 11 is a time chart of various signals on the NAND bus during the ID page reading operation.

As illustrated in FIG. 11, when the memory system 1 is started, the NAND interface circuit 230 of the controller 200 issues an address input command "00h", for example, in accordance with the control of the sequencer 250, and transmits the command to the NAND type flash memory 100 via the NAND input output circuit 240. The controller 200 subsequently transmits the address ADD to the NAND type flash memory 100, for example, for 5 clock cycles, and thereafter, issues a read command "30h" and transmit the command to the NAND type flash memory 100. The address ADD is an address designating the ID page P of the OTP area 111, and includes, for example, an address indicating the block, the page, and the column held in the register 280.

In response to the command "30h", in the NAND type flash memory 100, an operation of reading the data of the ID page P from the memory cell array 110 (OTP area 111) is started, and the NAND type flash memory 100 is in a state of busy (/RB="L") (S11).

When the reading of the data of the ID page P from the memory cell array 110 is completed, the NAND type flash memory 100 is in a ready state. In response to this, when the controller 200 toggles the signal /RE, the data DATA is transferred from the NAND type flash memory 100 to the controller 200 in synchronization with the signal /RE, for example, for 5 clock cycles. The data DATA includes the data of the ID page P.

For example, the host interface circuit 220 reads the data of ID page P from the data buffer 260 or 270 under the control of the sequencer 250, and stores the data in the register 280 (S12).

By the above-described ID page reading operation, the controller 200 reads the ID page P from the NAND type flash memory 100 and stores the ID page P in the register 280 at the time of starting. The controller 200 may read the ID page P from the NAND type flash memory 100 and may store the ID page P in the register 280 according to an operation different from the above description.

Figure 12:
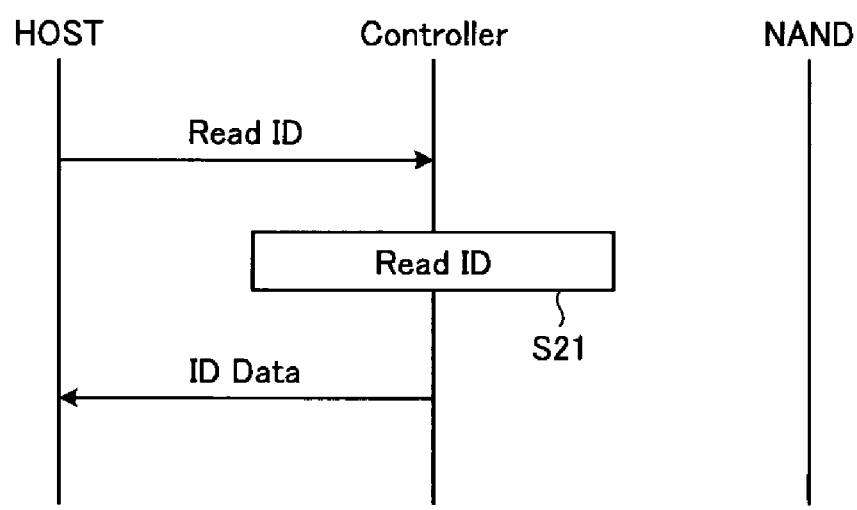
FIG. 12 is a diagram illustrating an example of operations of a host device and the controller during the ID reading operation, according to the embodiment.
Figure 13:
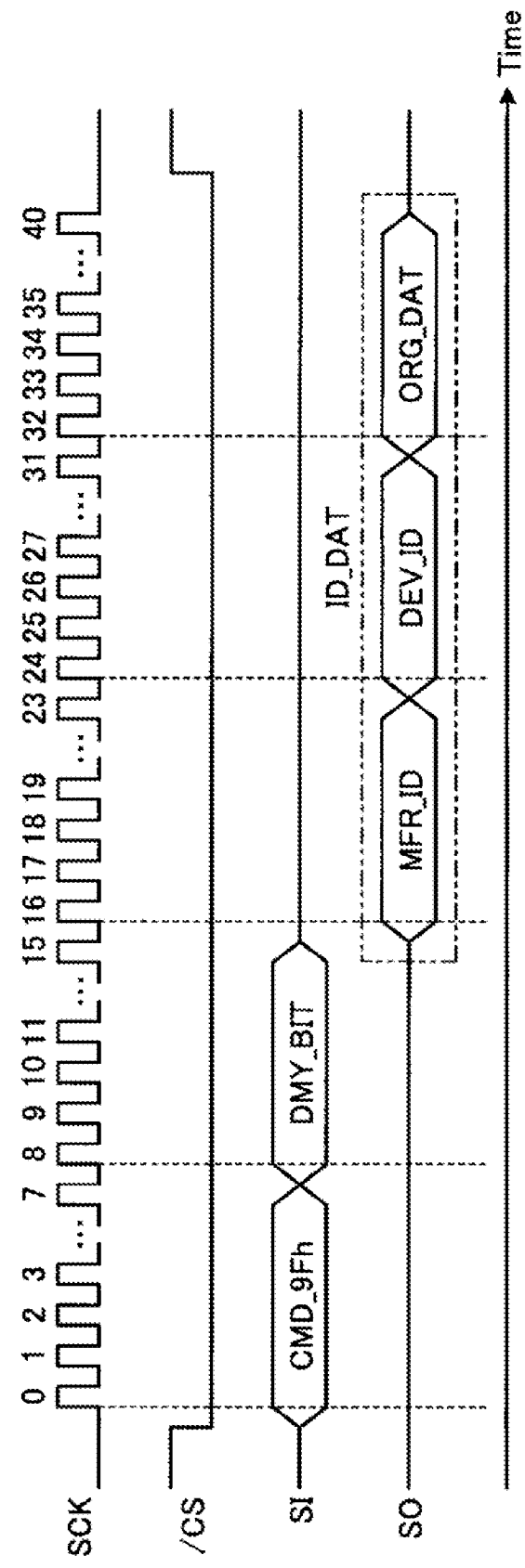
FIG. 13 is a time chart of various signals on an SPI bus during the ID reading operation, according to the embodiment.

Next, the ID reading operation in the memory system 1 according to the present embodiment will be described. FIG. 12 is a diagram illustrating an example of operations of the host device 500 and the controller 200, during the ID reading operation according to the present embodiment. FIG. 13 is a time chart of various signals on the SPI bus during the ID reading operation.

As illustrated in FIG. 13, the host device 500 asserts the signal /CS and issues an ID read command CMD_9Fh as the signal SI, and further issues a clock signal SCK.

The host interface circuit 220 of the controller 200 recognizes the signal SI when the signal /CS is asserted and receives the first clock signal SCK as the command. This command is, for example, an 8-bit signal input for 8 clock cycles. As described above, the controller 200 recognizes a signal received immediately after the signal /CS is received from the host device 500 as a command. Upon receipt of the ID read command CMD_9Fh, the sequencer 250 starts an ID read sequence. Subsequently, the host device 500 transmits a dummy bit DMY_BIT to the controller 200 for eight clock cycles, for example.

When the controller 200 recognizes the ID read command CMD_9Fh, for example, under the control of the sequencer 250, the host interface circuit 220 reads ID information ID_DAT from the register 280 (S21). The ID information ID_DAT is an example of response information. After the host device 500 outputs the dummy bit DMY_BIT for eight clock cycles, the host interface circuit 220 transmits the read ID information ID_DAT to the host device 500.

The ID information ID_DAT is a data group having data size indicated in the output size information SIZE_DAT stored in the register 280, and includes the data stored in the area adjacent to the output size information SIZE_DAT among the data group stored in ID page P in the register 280. In other words, the controller 200 outputs the data group stored in the area adjacent to the output size information SIZE_DAT within the range of data size indicated in the output size information SIZE_DAT.

In the present embodiment, as an example, the output size information SIZE_DAT is set to indicate that the data size of the ID information ID_DAT is 3 bytes. Therefore, the ID information ID_DAT is a 3-byte data group including the manufacturer ID information MFR_ID, the device ID information DEV_ID, and the organization information ORG_DAT. That is, the host interface circuit 220 transmits the manufacturer ID information MFR_ID, the device ID information DEV_ID, and the organization information ORG_DAT to the host device 500 in this order.

A minimum value of the data size indicated by the output size information SIZE_DAT is 2 bytes. In addition, a maximum value of the data size indicated by the output size information SIZE_DAT is set by the data size of the output size information SIZE_DAT or the data size defined as one page. Therefore, the ID information ID_DAT includes any one of: (i) the manufacturer ID information MFR_ID and the device ID information DEV_ID, and (ii) manufacturer ID information MFR_ID, the device ID information DEV_ID, and other information such as the organization information ORG_DAT. That is, the controller 200 can change the data size and the code value of the ID information ID_DAT to be output when the ID read command CMD_9Fh is recognized, based on the output size information SIZE_DAT.

When receiving the ID information ID_DAT, the host device 500 de-asserts the signal /CS. The host device 500 may de-assert the signal /CS after receiving all of the ID information ID_DAT, or may de-assert the signal /CS after receiving the manufacturer ID information MFR_ID and the device ID information DEV_ID.

The host device 500 recognizes the memory system 1 by receiving the ID information ID_DAT including the manufacturer ID information MFR_ID and the device ID information DEV_ID. Furthermore, the host device 500 acquires the information used for the control of the memory system 1 by the organization information ORG_DAT.

The host device 500 may not recognize the organization information ORG_DAT included in the ID information ID_DAT. In this case, for example, the host device 500 may separately issue a parameter page command to obtain the information used for the control of the memory system 1 from the memory system 1. In addition, the host device 500 may acquire the information used for the control of the memory system 1 corresponding to the manufacturer ID information MFR_ID and the device ID information DEV_ID, from a table in the host device 500.

In the memory system 1 according to the present embodiment described above, when the ID read command CMD_9Fh is recognized, the controller 200 outputs, to the host device 500, the ID information ID_DAT that has the data size (size) indicated in the output size information SIZE_DAT and includes any one of: (i) the manufacturer ID information MFR_ID and the device ID information DEV_ID, and (ii) the manufacturer ID information MFR_ID, the device ID information DEV_ID, and the organization information ORG_DAT. In this way, the data size of the ID information ID_DAT output from the controller 200 in response to the ID read command CMD_9Fh can be set to a desired data size according to the output size information SIZE_DAT. Therefore, for example, even in the memory system 1 having the same circuit configuration, it is possible to flexibly set the data size of the ID information ID_DAT according to the specification or the customer requirements. For example, the ID information ID_DAT may include the manufacturer ID information MFR_ID, the device ID information DEV_ID, and the organization information ORG_DAT according to the specifications and customer requirements, according to the output size information SIZE_DAT.

In the present embodiment, the organization information ORG_DAT is an example of the fourth information. However, other types of information may be an example of the fourth information, or organization information ORG_DAT and other information may be included in the ID information ID_DAT as the fourth information.

The controller 200 reads the ID page P including the output size information SIZE_DAT, the manufacturer ID information MFR_ID, the device ID information DEV_ID, and the organization information ORG_DAT from the NAND type flash memory 100 at the time of starting, and stores the ID page P in the register 280 of the controller 200. When recognizing the ID read command CMD_9Fh, the controller 200 outputs the ID information ID_DAT having the size indicated by the output size information SIZE_DAT stored in the register 280 to the host device 500. In this way, the controller 200 can output the ID information ID_DAT to the host device 500, for example, at a response timing corresponding to the general ID read command CMD_9Fh in the SPI, without having to read the information from the NAND type flash memory 100 every time it recognizes the ID read command CMD_9Fh.

The manufacturer ID information MFR_ID, the device ID information DEV_ID, and the organization information ORG_DAT are stored in areas adjacent to the output size information SIZE_DAT. In this way, the output size information SIZE_DAT, the manufacturer ID information MFR_ID, the device ID information DEV_ID, and the organization information ORG_DAT can be read as one page of data at the same time.

The output size information SIZE_DAT, the manufacturer ID information MFR_ID, the device ID information DEV_ID, and the organization information ORG_DAT are stored in the OTP area 111 that is a one-time-only writable area in the NAND type flash memory 100. In this way, the output size information SIZE_DAT, the manufacturer ID information MFR_ID, and the device ID information DEV_ID are prevented from being over-written.

The organization information ORG_DAT includes the page size indicating the size of data to be collectively read and written, the block size indicating the size of data to be collectively erased, and the OOB size indicating the size of redundant area used for ECC. In this way, it is no longer necessary for the host device 500 to perform an operation to acquire the information separately, and thus, it is possible to shorten the time it takes for the memory system 1 to become usable for the host device 500. Furthermore, the amount of data in the host device 500 can be reduced because the host device 500 does not need to have to separately request this information.

The embodiment is not limited to the above-described embodiment, and various modifications may be made. For example, in the embodiment described above, the NAND type flash memory 100 and the controller 200 are semiconductor chips separate from each other. However, those may be formed in one chip. A block diagram of the memory system 1 in this case is illustrated in FIG. 14.

Figure 14:
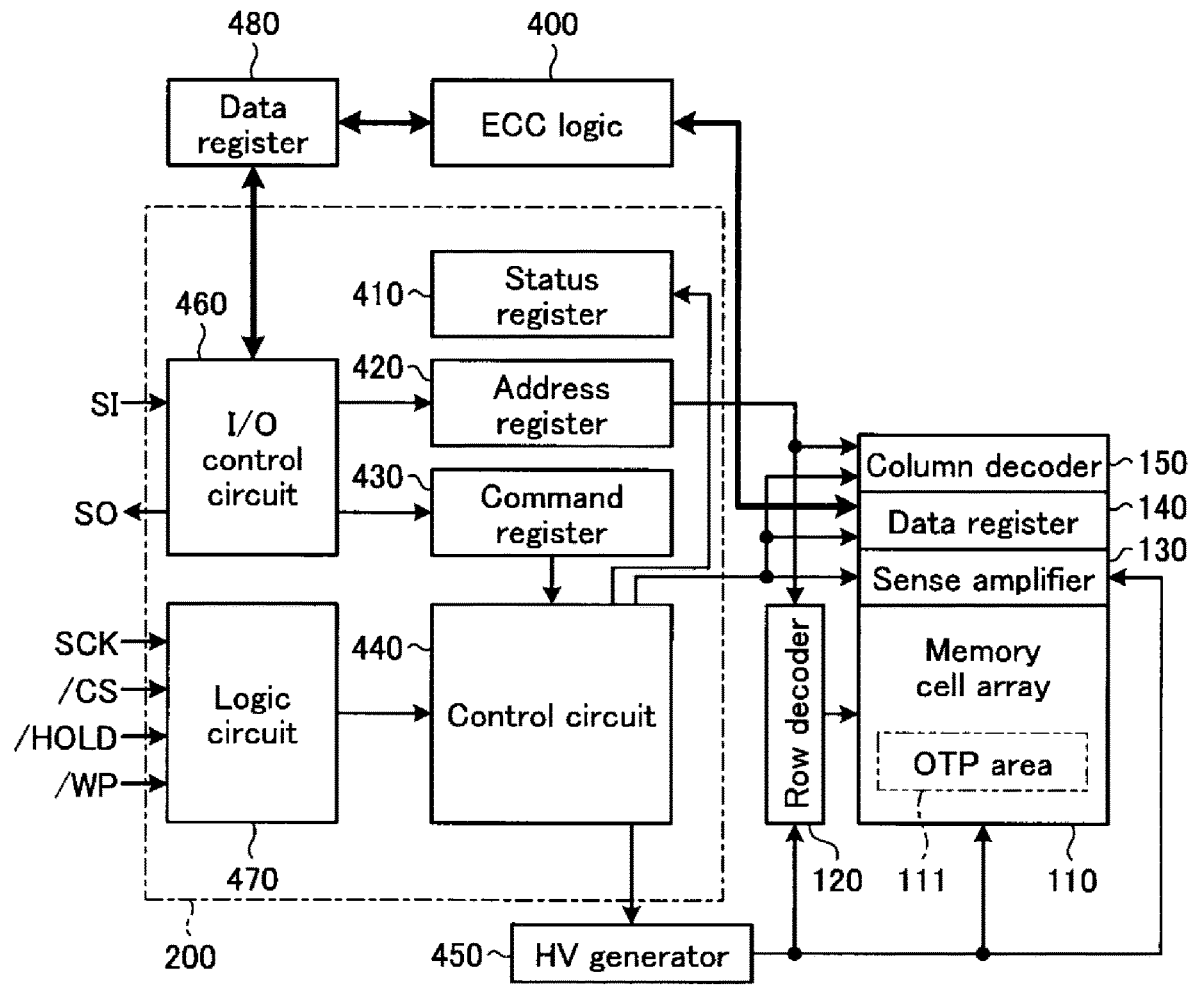
FIG. 14 is a functional block diagram schematically illustrating an internal configuration of a memory system when a NAND type flash memory and a controller of the embodiment are formed on one chip.

As illustrated in FIG. 14, the block configuration is the same as that in FIG. 7, but the signals SCK, /CS, /HOLD, and /WP from the host device 500 are input to the logic circuit 470, and the signals SI and SO are input and output via the input output control circuit 460. The registers 410, 420, 430, the control circuits 440 and 460, and the logic circuit 470 function as the controller 200. That is, the control circuit 440 functions as the sequencer 250 and the host interface circuit 220, and identifies the command from the host device 500 by the signal /CS. The input output control circuit 460 and the logic circuit 470 function as a host input output circuit 210. The registers 410 and 420 function as the register 280, and the ID page P is held, for example, in the status register 410 or the like.

In addition, the order of each processing in the flowchart described in the embodiment above may be changed in alternative implementations of the embodiment.

Furthermore, the timing chart described in the embodiment above is only an example, and the number of clock cycles necessary for inputting the signal SI and the number of clock cycles necessary for outputting the signal SO are not limited to the embodiment described above. In addition, depending on the command, dummy bits are input immediately after the command, but the embodiment is not limited thereto.

Figure 15:
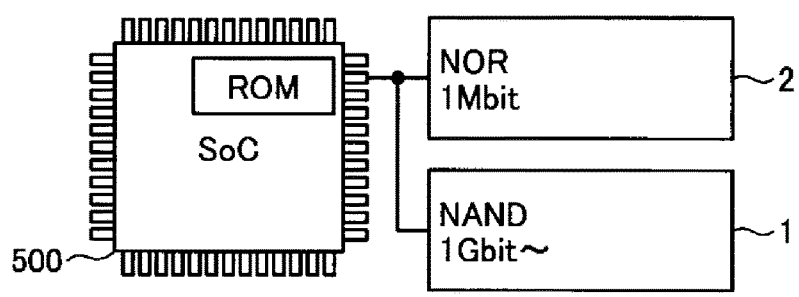
FIG. 15 is a schematic diagram illustrating the memory system according to the embodiment, that is used in conjunction with a NOR type flash memory to start an application.

In addition, the memory system described in the embodiment above may also be used to start an application such as a television set or a set top box, for example. FIG. 15 illustrates an example of such a system. In the example in FIG. 15, a NOR type flash memory 2 is prepared in addition to the memory system 1, and the memory system 1 and the NOR type flash memory 2 are commonly connected by the SPI interface. In this example, a command (the ID read command 9Fh or the like) for controlling the memory system 1 is stored in the NOR type flash memory 2. At the time of starting the host device 500, the host device 500 reads the above-described command information from the NOR type flash memory 2 according to the sequence stored in the ROM in the host device 500. Then, using this command information, the host device 500 reads the starting sequence from the memory system 1 and executes the sequence to start the application.

Figure 16:
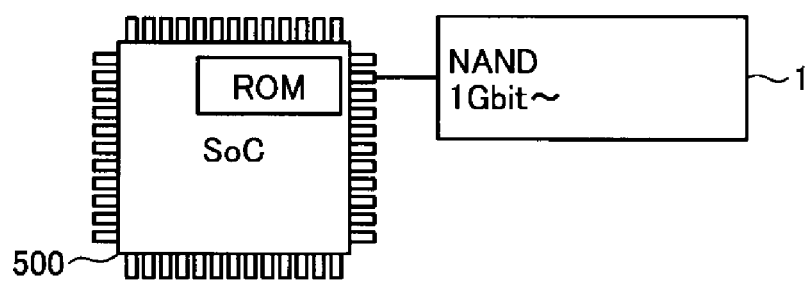
FIG. 16 is a schematic diagram illustrating the memory system according to the embodiment, that is used to start an application without a NOR type flash memory.

Alternatively, if the command information for the memory system 1 is stored in the ROM of the host device 500, the NOR type flash memory 2 may be omitted as illustrated in FIG. 16.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a controller that is connectable to a host device by a bus conforming to a serial peripheral interface (SPI) standard, and configured to receive a command signal that is received over the bus immediately after a chip select signal is received over the bus; and
a non-volatile memory device that stores first information indicating a data size, second information indicating a manufacturer ID, third information indicating a device ID, and fourth information,
wherein the controller, upon recognizing that the command signal an identification (ID) read command, outputs, to the host device, response information that is generated from the first information, the second information, the third information, and the fourth information that are read from the non-volatile memory, and has the data size indicated by the first information, and
wherein the response information having the data size indicated by the first information does not include the first information and includes one of: (i) the second information and the third information, and (ii) the second information, the third information, and the fourth information.

2. The memory system according to claim 1, wherein
the controller includes a storage area, and reads a group of information including the first information, the second information, the third information, and the fourth information from the non-volatile memory device during start-up of the memory system to store the group of information in the storage area, and upon recognizing the command signal as the ID read command, outputs to the host device the response information stored in the storage area and having the data size indicated in the first information.

3. The memory system according to claim 1, wherein the second information, the third information, and the fourth information are stored adjacent to the first information.

4. The memory system according to claim 3, wherein the second information is stored adjacent to the first information, the third information is stored adjacent to the second information, and the fourth information is stored adjacent to the third information.

5. The memory system according to claim 1, wherein the first information, the second information, the third information, and the fourth information are stored in a one-time-only writable area in the non-volatile memory device.

6. The memory system according to claim 5, wherein the one-time-only writable area comprises a fuse-type writable area.

7. The memory system according to claim 1, wherein the fourth information includes information indicating a unit size of data to be collectively read and written, information indicating a unit size of data to be collectively erased, and information indicating a size of a redundant area used for Error Checking and Correction (ECC).

8. The memory system according to claim 1, wherein the first information indicates a size of data corresponding to a block of data comprising the second information, the third information and the fourth information as stored in the non-volatile memory device.

9. A method of accessing identification information in a memory system comprising a controller connected to a host device via a first bus conforming to a serial peripheral interface (SPI) standard and a non-volatile memory device connected to the controller via a second bus, the method comprising:
  receiving, by the controller, a command signal over the first bus immediately after receiving a chip select signal from the host device over the first bus;
  recognizing, by the controller, that the command signal is an identification (ID) read command; and
  upon recognizing that the command signal is the ID read command,
  outputting, by the controller, to the host device over the first bus, response information that is generated from the first information, the second information, the third information, and the fourth information that are read from the non-volatile memory, and has the data size indicated by the first information, wherein the response information having the data size indicated by the first information does not include the first information and includes one of: (i) the second information and the third information, and (ii) the second information, the third information, and the fourth information.

10. The method according to claim 9, further comprising:
  during start-up of the memory system, issuing by the controller a command to read the first information, the second information, the third information, and the fourth information from the non-volatile memory device, and storing the first information, the second information, the third information, and the fourth information read from the non-volatile memory device in a storage area of the controller.

11. The method according to claim 10, wherein
  upon recognizing the command signal as the ID read command, the response information stored in the storage area and having the data size indicated in the first information is outputted to the host device.

12. The method according to claim 9, wherein the second information, the third information, and the fourth information are stored adjacent to the first information.

13. The method according to claim 12, wherein the second information is stored adjacent to the first information, the third information is stored adjacent to the second information, and the fourth information is stored adjacent to the third information.

14. The method according to claim 9, wherein the first information, the second information, the third information, and the fourth information are stored in a one-time-only writable area in the non-volatile memory device.

15. The method according to claim 14, wherein the one-time-only writable area comprises a fuse-type writable area.

16. The method according to claim 9, wherein the fourth information includes information indicating a unit size of data to be collectively read and written, information indicating a unit size of data to be collectively erased, and information indicating a size of a redundant area used for Error Checking and Correction (ECC).

17. A memory system comprising:
  a controller having a host interface circuit configured to communicate with a host device according to a serial peripheral interface (SPI) standard, a storage area in which identification (ID) information is to be stored, and a memory interface circuit; and
  a non-volatile memory device that is connected to the memory interface circuit and stores first information indicating a data size, second information indicating a manufacturer ID, third information indicating a device ID, and fourth information, wherein
  during start-up of the memory system, the controller issues a command to read the first information, the second information, the third information, and the fourth information from the non-volatile memory device, and stores the first information, the second information, the third information, and the fourth information read from the non-volatile memory device in the storage area, and
  upon recognizing a command signal received from the host device as an identification (ID) read command, the controller outputs, to the host device, response information that is generated from the first information, the second information, the third information, and the fourth information, and has the data size indicated by the first information, wherein the response information having the data size indicated by the first information does not include the first information and includes any one of: (i) the second information and the third information, and (ii) the second information, the third information, and the fourth information.

18. The memory system according to claim 17, wherein the first information, the second information, the third information, and the fourth information are stored in a one-time-only writable area in the non-volatile memory device.

19. The memory system according to claim 18, wherein the one-time-only writable area comprises a fuse-type writable area.

20. The memory system according to claim 17, wherein the fourth information includes information indicating a unit size of data to be collectively read and written, information indicating a unit size of data to be collectively erased, and information indicating a size of a redundant area used for Error Checking and Correction (ECC).

* * * * *